US008184853B2

(12) United States Patent
Pilu et al.

(10) Patent No.: US 8,184,853 B2
(45) Date of Patent: May 22, 2012

(54) METHOD OF TRIGGERING A DETECTOR TO DETECT A MOVING FEATURE WITHIN A VIDEO STREAM

(75) Inventors: Maurizio Pilu, Stoke Gifford Bristol (GB); Darryl Greig, Stoke Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1158 days.

(21) Appl. No.: 11/492,189

(22) Filed: Jul. 25, 2006

(65) Prior Publication Data

US 2007/0098220 A1    May 3, 2007

(30) Foreign Application Priority Data

Oct. 31, 2005  (GB) .................................. 0522218.7

(51) Int. Cl.
G06K 9/00 (2006.01)
G06K 9/46 (2006.01)
G06K 9/52 (2006.01)
H04N 5/225 (2006.01)

(52) U.S. Cl. ........ 382/103; 382/190; 382/206; 382/203; 382/118; 382/100; 348/169

(58) Field of Classification Search .................... 348/169
See application file for complete search history.

(56) References Cited

U.S. PATENT DOCUMENTS

| 5,099,322 | A | * | 3/1992 | Gove | 348/700 |
|---|---|---|---|---|---|
| 5,482,048 | A | * | 1/1996 | Johnson | 600/476 |
| 5,644,642 | A | * | 7/1997 | Kirschbaum | 382/103 |
| 6,128,397 | A | * | 10/2000 | Baluja et al. | 382/118 |
| 6,633,655 | B1 | * | 10/2003 | Hong et al. | 382/118 |
| 6,650,770 | B2 | * | 11/2003 | DeYong et al. | 382/149 |
| 7,050,607 | B2 | * | 5/2006 | Li et al. | 382/118 |
| 7,212,666 | B2 | * | 5/2007 | Zhang et a | 382/162 |
| 7,248,987 | B2 | * | 7/2007 | Sugiura | 702/117 |
| 7,391,888 | B2 | * | 6/2008 | Hu et al. | 382/118 |
| 7,519,206 | B2 | * | 4/2009 | Mulet-Parada et al. | 382/128 |
| 7,526,101 | B2 | * | 4/2009 | Avidan | 382/103 |
| 2004/0136567 | A1 | * | 7/2004 | Billinghurst et al. | 382/103 |
| 2004/0161132 | A1 | * | 8/2004 | Cohen et al. | 382/103 |
| 2004/0186816 | A1 | | 9/2004 | Lienhart et al. | |

(Continued)

FOREIGN PATENT DOCUMENTS

EP    0 989 759 A1    3/2000
EP    0 984 386 B1    12/2004

OTHER PUBLICATIONS

Feris et al, "Detection and Tracking of Facial features in Video Sequences", Apr. 2000, Lecture Notes in Artificial Intelligence vol. 1793 pp. 197-206.*

(Continued)

*Primary Examiner* — Jason M Repko
*Assistant Examiner* — Avinash J Yentrapati (57) ABSTRACT

Detectors capable of accurately detecting and tracking moving features of such as faces within a video stream are sometimes too slow to be run in real-time. The present invention rapidly scans video footage in real-time and generates a series of preattemptive triggers indicating the frames and locations within the frames at our deserving of further investigation by a sub real-time detector. The triggers are generated by looking for peaks in a time variant measure such as the amount of symmetry within a frame or portion of a frame.

11 Claims, 5 Drawing Sheets

U.S. PATENT DOCUMENTS

| | | | | |
|---|---|---|---|---|
| 2005/0105805 | A1* | 5/2005 | Nicponski | 382/216 |
| 2005/0285943 | A1* | 12/2005 | Cutler | 348/207.1 |
| 2006/0088207 | A1* | 4/2006 | Schneiderman | 382/159 |
| 2006/0165258 | A1* | 7/2006 | Avidan | 382/103 |
| 2007/0098220 | A1* | 5/2007 | Pilu et al. | 382/103 |
| 2008/0075337 | A1* | 3/2008 | Fukushi | 382/118 |
| 2008/0267458 | A1* | 10/2008 | Laganiere et al. | 382/118 |
| 2008/0298637 | A1* | 12/2008 | Hu et al. | 382/103 |
| 2009/0041297 | A1* | 2/2009 | Zhang et al. | 382/103 |

OTHER PUBLICATIONS

Viola et al, "Rapid Object Detection Using a Boosted Cascade of Simple Features", Computer Vision and Pattern Recognition, 2001, vol. 1 pp. 511-518.*

Cooray et al, "Facial Features and appearance based classification for face detection in color images", 2004, International Workshop on Systems, Signals and Image Processing, Sep. 13-15, 2004.*

Xial et al, "A novel algorithm for rotated human face detection", Computer Vision and Pattern Recognition 2000, vol. 1 pp. 760-765.*

Collins et al, "On-Line selection of Discriminative tracking features", Pattern Analysis and Machine Intelligence, Oct. 2005, vol. 27 pp. 1631-1643.*

Santanan et al, "Detection of Frontal Faces in Video Streams", Biometric Authentication, LNCS 2359 pp. 91-102, 2002.*

* cited by examiner

METHOD OF TRIGGERING A DETECTOR TO DETECT A MOVING FEATURE WITHIN A VIDEO STREAM

RELATED APPLICATIONS

The present application is based on, and claims priority from, Great Britain Application Serial Number 0522218.7, filed Oct. 31, 2005, the disclosure of which is hereby incorporated by reference herein in its entirety.

The present invention relates to a method of triggering a detector to detect a moving feature within a video stream. It finds particular although not exclusive application in the field of face detection and tracking.

There has been much recent work on optimizing face detection technology for real-time operation. Although the increasing speed and accuracy of face detectors can now provide real-time or near real-time performance on a powerful computing platform such as a PC, this cannot easily be translated to smaller devices such as PDAs or digital cameras.

Since face and other moving feature detectors are often too slow, with current technology, to be operated in real-time, it is convenient to provide some sort of trigger, generated from a real-time video stream, which notifies the detector of possible hits, which the detector can the investigate in more detail. Typically, the trigger may generate a large number of "false alarms", but that is not a serious problem unless the number of triggers being generated is so large that the detector is unable to keep up. Since the detector will not start us unless triggered, it is more important that the triggering mechanism does not miss interesting frames which merit more detailed investigation. A trigger of this type is sometimes known as a "preattemptive trigger".

Current preattemptive trigger systems may conveniently be divided into two categories, namely those that are based on the "blind" trigger, and those that are based on a "local trigger".

A "blind" trigger based only on then maximum frame rate of the face or feature detector. That is, whenever the face detector has concluded a pass on the image, the current frame is selected for processing.

A "local" trigger depends on the tracking mechanism. In this case the tracker isolates a localised patch which results from tracking a previously detected face or other feature. The patch is periodically sent to the face detector for confirmation and re-location of the face, but the decision to request confirmation depends only on the level of certainty in the tracking algorithm.

A specific example of the "local" trigger system, is described in:

U.S. patent US20040186816 A in which an object tracking algorithm (such as a Kalmann filter) is initialized using an object detector. After initialization the object detector is only triggered if the tracker fails, at which point the object detector is run on the whole frame to reinitialize the tracking algorithm.

None of the main systems are in practice particularly satisfactory, the face or object detector at an inappropriate point.

If inappropriate frames or locations are chosen by the triggering system, then the face detector may fail to find present faces and the face tracking performance will deteriorate.

According to the present invention there is provided a method of trigger a detector to detect a moving feature within a video stream the method comprising:

(a) a defining a static measure indicative of the presence of a feature of interest within a frame of the video stream;

(b) repeatedly determining a value of said measure for a sequence of frames to generate a corresponding sequence of values; and (c) triggering a detector in dependence upon a characteristic of the sequence of values.

The characteristic which is used to trigger the detector may be any convenient local measure of the sequence, and may be a probabilistic measure. In one embodiment, the characteristic (distinctive pattern) may be a local extremum, such as a maximum or a minimum. Preferably, the detector may be triggered when the sequence of values is determined to have peaked or troughed.

The invention further extends to a computer program carrying out such a method, and also to a computer readable media and to an electronic signal holding or representative of such a computer program.

In the preferred embodiment, the method is used to trigger a sub real-time face detector algorithm. Typically, face detectors/trackers make use of complex algorithms which the present technology is not always operable in real-time. The present invention conserves resources by triggering or authorising the face detector to run only when it is most likely to be successful, in other words when a fast operating preattemptive trigger has determined that there is likely to be a full frontal face in the frame. In a typical stretch of video including a head turning sequence, prior art techniques may often fail whereas the present invention succeeds by triggering the face detector to operate only on the most advantageous frame, namely the frame containing a full frontal face.

In a preferred embodiment, by simultaneously monitoring some specific measures of a video stream, we can determine both specific frames and sub frame locations likely to give the highest hit rate for the desired feature detector (for example for a frontal face detector). This enhances the usefulness of sub real-time feature detectors in real-time systems.

The invention may be carried into practice in a number of ways and one specific embodiment will now be described, by way of example, with reference to the accompanying drawings, in which:

The preferred embodiment is concerned with providing a pre-attemptive trigger for a face detector/tracker, for example within a digital camera or video system.

Figure 1:
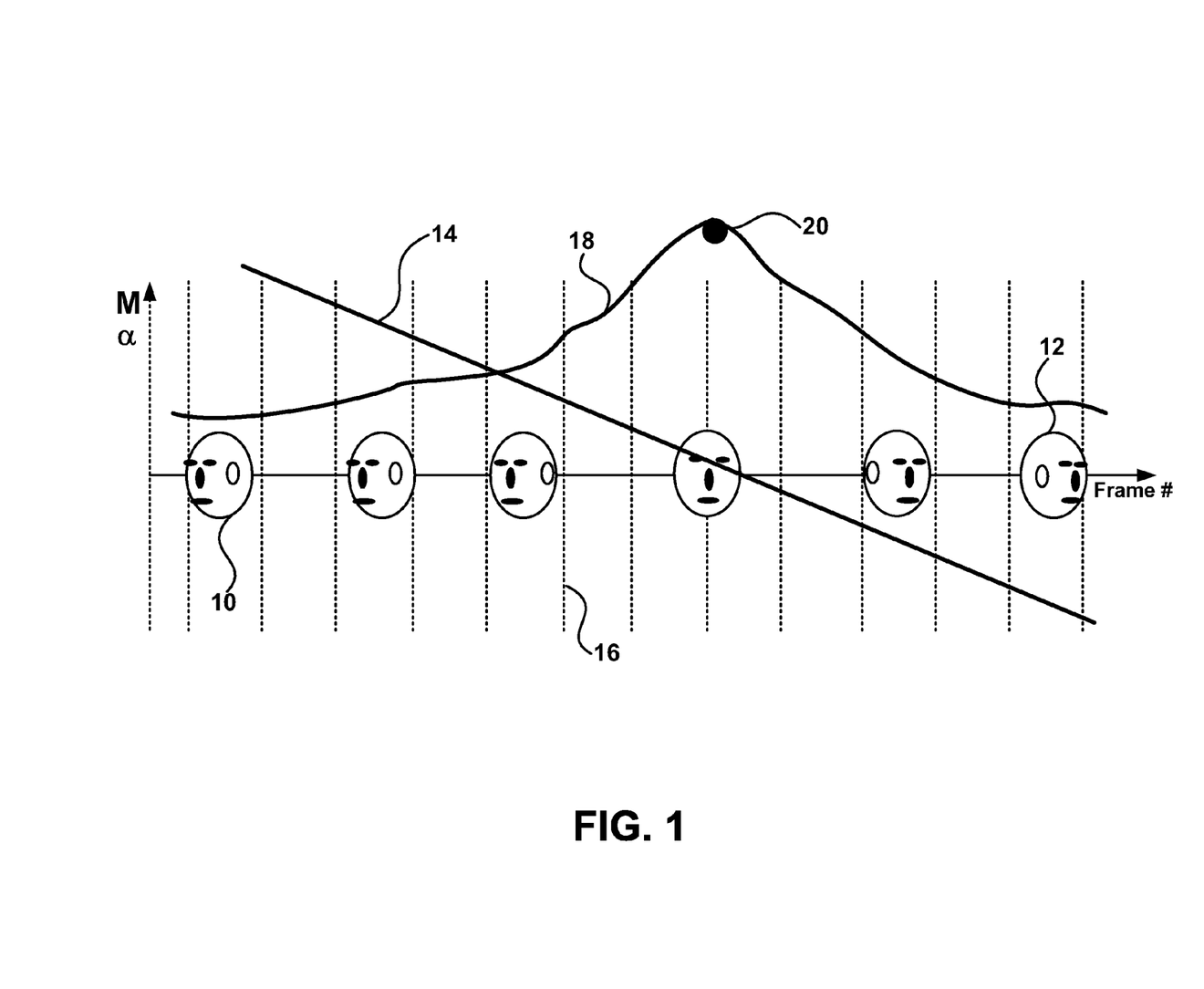
FIG. 1, schematically shows the operation of a system designed to trigger the face detector, based upon measurement of facial symmetry.
Figure 2:
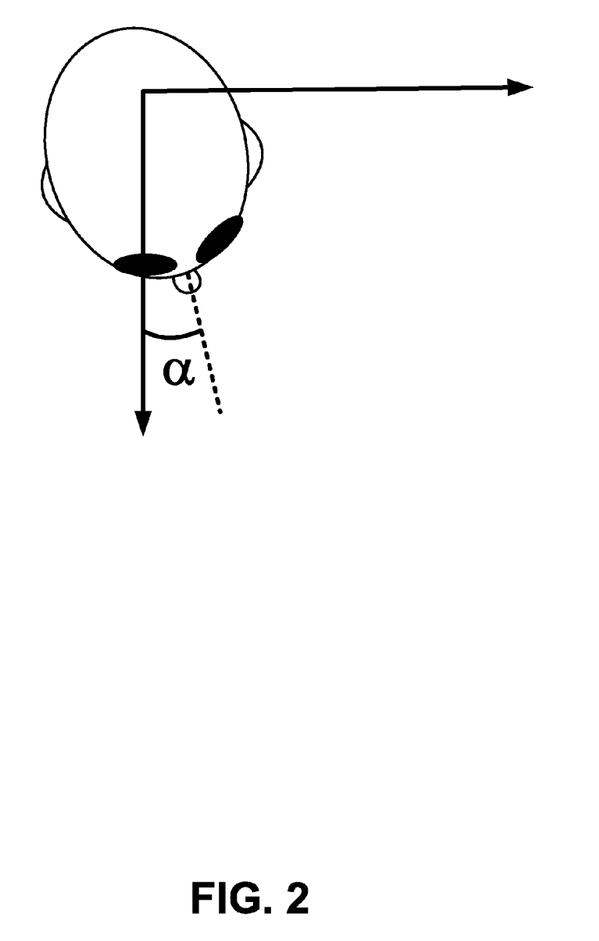
FIG. 2, illustrates the concept of facial angle.

As shown schematically in FIG. 1, a video sequence has been captured of a gradually turning human head. In a first frame 10, the subject is looking to the left, as seen by the camera operator, and as the video progresses the subject gradually turns until in the last frame 12 he or she is looking to the right. In this example, the head angle α (FIG. 2) gradually changes from a positive value at the start of the video to a negative value at the end, as shown by the line 14, FIG. 1. At the central position 16, when the subject is looking directly at the camera operator, α is 0.

As the video frames are captured, one by one in real-time, each frame is analysed by a rapid software procedure which provides a measure of the symmetry of the image. This measure of symmetry is shown by the line 18 in FIG. 1.

It will of course be understood that for a human or animal face, the level of symmetry is greatest at the full face position 16, when α equals 0. In operation, the value of the symmetry measure is monitored, frame by frame, and when the system determines that the measure has peaked, as shown in point 20 in the drawing, a more sophisticated face detector/tracker algorithm is triggered. The peak value of the symmetry measure may be determined in any convenient manner using a conventional peak detection mechanism. It will of course be understood that in a real-time environment it will not be possible to detect a peak until several frames after the peak has occurred, but the necessary short delay in real-time peak determination is not in practice normally significant. Once the peak has been satisfactorily been detected, the face detector is triggered, and it is instructed to commence operations on the frame 16 at which the peak has occurred.

As the face detection/tracking algorithm attempts to detect and track the facial image starting from the frame 16, in sub real-time, the real-time video continues in parallel, with the system repeatedly looking for peaks in the signal. Each time a peak is found, a new trigger is generated, and another instance of the face detection tracking algorithm started. Provided that the trigger infrequency is not so rapid that it overloads the sub real-time face detector, the overall result of running the face detector periodically only when triggered is to mimic very effectively through real-time face detection.

In a more sophisticated system, a symmetry measure may be calculated not only for each entire frame, but also for a variety of smaller locations or sub frames, each of which will generate its own symmetry measure. All of these measures are monitored simultaneously, and when a peak is detected in a given sub frame output, the face detector algorithm is triggered just for that sub frame. In other words, whenever a peak is detected, the system passes to the face detector not only an identification of the particular frame at which the peak was detected, but also the location or area within the frame. By ensuring that the face detector concentrates only on specific locations within the frame which have been identified as interesting by the pre-emptive trigger, the resources can be conserved. Another possibility which may be used alone or in conjunction with the above is to repeat the calculation of the measure of symmetry at a variety of different scales or resolutions within the image, and where appropriate also to pass scale information onto the face detector.

By ensuring that the system triggers only for full face images, we can conserve resources by instructing the face detector to operate only on frames where there is reasonable possibility of success. In the video sequence of FIG. 1, allowing the face detector to operate at any starting point other than the central frame 16 would be much more likely to result in failure.

The algorithm used to determine the measure of symmetry 16 will typically operate on a frame by frame basis, and has to be relatively fast since it will normally need to operate in real-time. Any convenient method of determining symmetry may be used, including methods which are specially designed to identify faces such as any or all of the following: Marola, G., *"On the detection of the axes of symmetry of symmetric and almost symmetric planar object"*, IEEE Trans. Pattern Analysis and Machine Intelligence, Vol. 11, No. 1, January 1989; Reisfeld, D. and Yeshurun, Y. *"Robust Detection of Facial Features by Generalized Symmetry, conf. on Pattern Recognition"* (I:117-120); Daniel Reisfeld, Haim Wolfson, Yehezkel Yeshurun *"Context-free attentional operators: the generalized symmetry transform"* International Journal of Computer Vision Volume 14, Issue 2 (March 1995), pp 119-130.

Where faces are to be detected, other methods could of course be used to generate the pre-attentive triggers, for example the tracking of eye candidates frame by frame, with the static measure being the distance between the eyes. An alternative static measure could be the evolution of the candidate patches of skin within the image (this being particularly useful when the facial image may not be particularly symmetric, such as a woman having long hair which partially obscures the face). Triggering could also be designed for non-frontal faces, such as full profile, by employing appropriate static measures.

It will be understood that the present invention may also find application in other fields in which preattemptive triggers are used. For example, similar methods could be applied to detect turning cars, vehicles, or generally any moving objects that has a plane of symmetry. Both the algorithm for generating the preattemptive triggers, and the detector which runs as a result of those triggers, may be optimised in any particular application for the specific object or type of object to be detected or tract.

Figure 3:
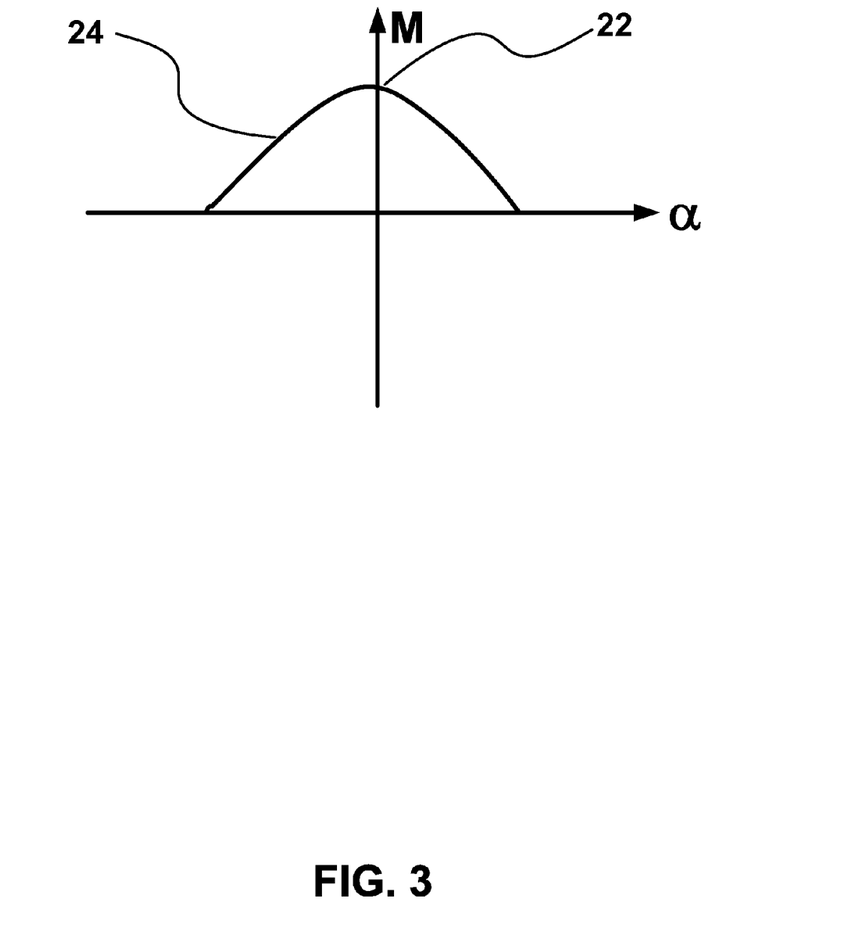
FIG. 3, shows an idealised output from the system.

Even more generally, as shown in FIG. 3, embodiments of the invention are designed to generate a trigger when a peak 22 is identified within a sequence 24 of values of a measure M. Normally, the measure M will be determined for each consecutive frame within the video, although a lesser frequency may be chosen if the preattemptive trigger mechanism is not capable of running fast enough to keep up with the frame rate.

Although in the embodiment above, it is proposed that a trigger be generated on the detection of a peak or a maximal value of the measure, other mathematical algorithms achieving similar ends could equally well be substituted, for example the detection of a trough or minimal value of the measure.

Figure 5:
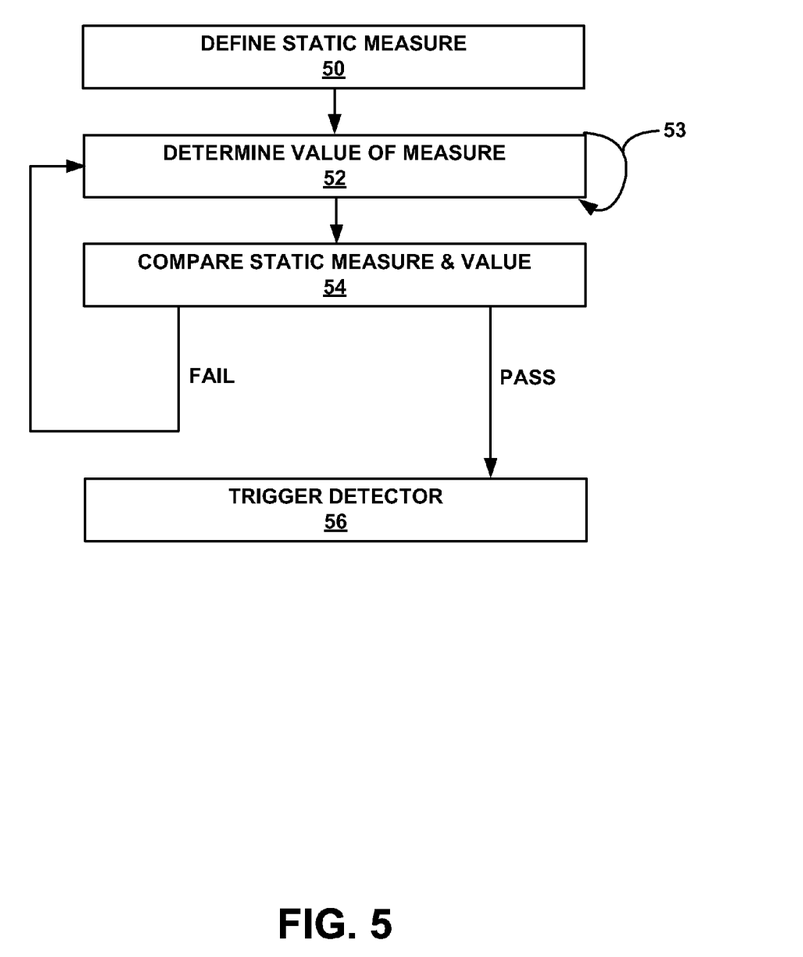
FIG. 5, is a schematic flow chart showing a method according to the present invention.

One method embodying the invention is shown schematically in FIG. 5. At step 50, a static measure is defined which is indicative of the presence of a feature of interest within a frame of the video stream. At step 52, a value of the said measure is repeatedly determined for a sequence of frames (as indicated by the curved area 53) to generate a corresponding sequence of values. At step 54, the sequence of values is compared with the static measure in a pass/fail test. If the test fails, control returns to step 52, and the measure is determined again for a new frame, or a new sequence of frames. If the test passes, the detector is triggered at step 56.

The invention may find practical application in such areas as digital video photography, where it may be useful to display on an LCD screen in near real-time, an overlaid box or other indication of the position of a face which has been identified and is being tracked. In a still digital camera system, the invention could be used to follow the movement of one or more faces within an image and to automatically trigger the shutter release at an appropriate point to ensure that a full face portrait was taken.

Figure 4:
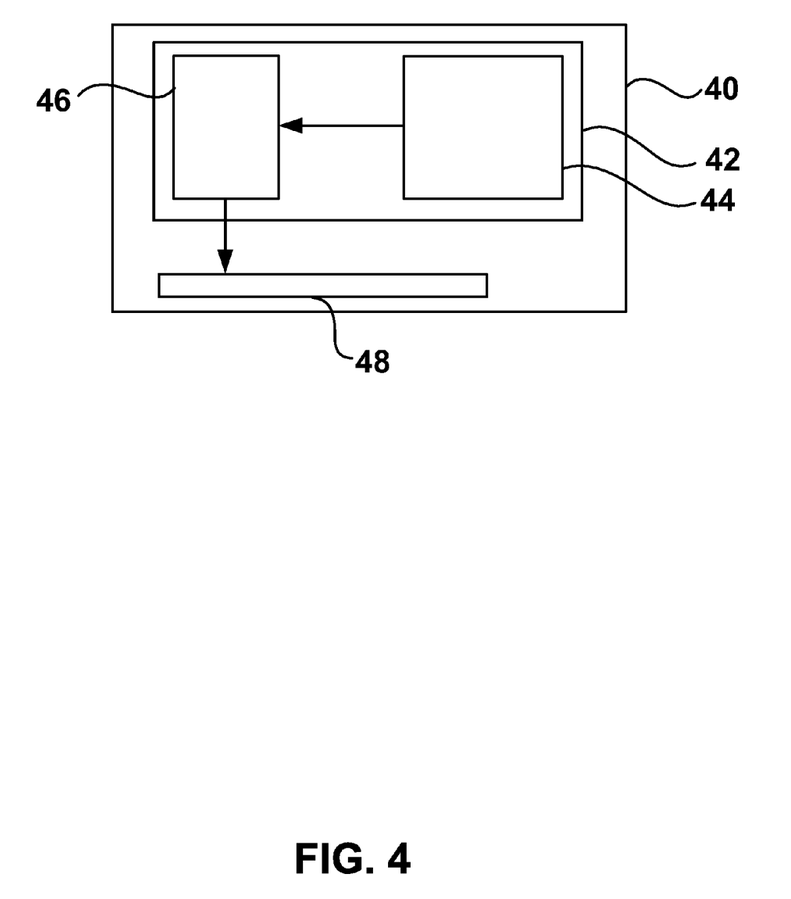
FIG. 4, schematically shows an apparatus according to an embodiment of the invention.

In practical a embodiment, the method described above may be implemented within some suitable apparatus or hardware such as a camera 40 (FIG. 4). Within the camera is a digital computer or microchip 42 which, when suitably programmed or coded, embodies a measurer 44 for repeatedly determining a value of a static measure indicative of the presence of a feature of interest within a frame of the video stream, and a trigger 46 for triggering a detector 48 in dependence upon a characteristic of the sequence of values. It will be understood, of course, that instead of programming a computer or microchip, the measurer and trigger may be embodied within a special purpose hard coded or hard wired device 42.

The invention claimed is:

1. A computer-implemented method of triggering a detector to detect a moving feature within a video stream, the method comprising:
    defining a static measure indicative of the presence of a moving feature of interest within a frame of the video stream at a computer;
    repeatedly determining a value of said static measure for a sequence of frames to generate a corresponding sequence of values at said computer, wherein said sequence of values indicate a head turning sequence within said sequence of frames, and wherein said sequence of values provides a measure of a symmetry of said moving feature of interest; and
    triggering a face detector configured to detect said moving feature within said video stream only in dependence upon a characteristic of the sequence of values at said computer, wherein said characteristic is a local extremum, wherein said local extremum is a peak measure of said symmetry of said moving feature of interest, and signifies a frame containing a full frontal face, thereby conserving resources by triggering said face detector to run only when it is most likely to be successful.

2. The computer-implemented method of claim 1 in which said video stream is a real-time stream and in which said detector operates in sub-real-time.

3. The computer-implemented method of claim 1 in which a plurality of measures are determined for a corresponding plurality of locations within a frame to generate a plurality of sequences of values, each sequence being monitored separately for said characteristic.

4. The computer-implemented method of claim 3 in which the detector is configured to search for the monitoring feature at the location of the frame where said characteristic has been detected.

5. The computer-implemented method of triggering a detector in claim 1 in which the characteristic comprises a peak or a trough in the sequence of values.

6. The computer-implemented method of triggering a detector in claim 1 in which the characteristic is a probabilistic characteristic.

7. A non-transitory computer-readable storage medium comprising instructions thereon which, when executed by a computer system, cause said computer system to perform a method for triggering a detector to detect a moving feature within a video stream, said method comprising:
    defining a static measure indicative of the presence of a moving feature of interest within a frame of the video steam;
    repeatedly determining a value of said static measure for a sequence of frames to generate a corresponding sequence of values, wherein said sequence of values indicate a head turning sequence within said sequence of frames, and wherein said sequence of values provides a measure of a symmetry of said moving feature of interest; and
    triggering a face detector configured to detect said moving feature within said video stream only in dependence upon a characteristic of the sequence of values, wherein said characteristic is a local extremum, wherein said local extremum is a peak measure of said symmetry of said moving feature of interest, and signifies a frame containing a full frontal face, thereby conserving resources by triggering said face detector to run only when it is most likely to be successful.

8. A computer system for triggering a detector to detect a moving feature within a video stream, the computer system comprising:
    a measurer for repeatedly determining a value of a static measure, thus determining a sequence of values, indicative of the presence of a moving feature of interest within a frame of the video stream, wherein said sequence of values indicate a head turning sequence within said sequence of frames, and wherein said sequence of values provides a measure of a symmetry of said moving feature of interest; and
    a trigger for triggering a face detector only in dependence upon a characteristic of said sequence of values, wherein said face detector is configured to detect said moving feature within said video stream and wherein said characteristic is a local extremum, wherein said local extremum is a peak measure of said symmetry of said moving feature of interest, and signifies a frame containing a full frontal face, thereby conserving resources by triggering said face detector to run only when it is most likely to be successful.

9. The computer system of claim 8 in which said video stream is a real-time stream and in which said detector operates in sub-real-time.

10. The computer system of 8 in which a plurality of measures are determined for a corresponding plurality of locations within a frame to generate a plurality of sequences of values, each sequence being monitored separately for said characteristic.

11. The computer system of claim 10 in which the detector is configured to search for the monitoring feature at the location of the frame where said characteristic has been detected.

* * * * *

UNITED STATES PATENT AND TRADEMARK OFFICE
CERTIFICATE OF CORRECTION

PATENT NO. : 8,184,853 B2  
APPLICATION NO. : 11/492189  
DATED : May 22, 2012  
INVENTOR(S) : Maurizio Pilu et al.

Page 1 of 1

It is certified that error appears in the above-identified patent and that said Letters Patent is hereby corrected as shown below:

In column 6, line 41, in Claim 10, after "system of" insert -- claim --.

Signed and Sealed this  
Twenty-fifth Day of December, 2012

David J. Kappos  
*Director of the United States Patent and Trademark Office*